United States Patent [19]
Baurle

[11] 3,765,183
[45] Oct. 16, 1973

[54] CONTINUOUSLY VARIABLE HYDROSTATIC TRANSMISSION

[75] Inventor: Horst Baurle, Schwieberdingen, Germany

[73] Assignee: Robert Bosch GmbH, Stuttgart, Germany

[22] Filed: Aug. 15, 1972

[21] Appl. No.: 280,902

[30] Foreign Application Priority Data
Aug. 18, 1971 Germany.................. P 21 41 282.8

[52] U.S. Cl..................... 60/491, 91/497, 91/492, 92/12.1
[51] Int. Cl. ...................... F16h 39/16, F16h 39/46
[58] Field of Search ............... 60/491, 490; 91/472, 91/491, 492, 497; 418/164; 92/12.1

[56] References Cited
UNITED STATES PATENTS
2,186,556  1/1940  Robbins........................... 91/497 X
3,690,097  9/1972  Widmaier........................ 91/492 X FOREIGN PATENTS OR APPLICATIONS
240,441  10/1926  Great Britain...................... 60/491

Primary Examiner—Edgar W. Geoghegan
Attorney—Michael S. Striker

[57] ABSTRACT

A hydrostatic transmission includes two axially aligned radial piston machines operating as a pump and motor, and having cylinder blocks secured to a housing and to an output shaft, respectively, and actuator rings whose eccentricities are simultaneously adjusted by adjusting means surrounding the actuator means and connected therewith by cam slots and cam followers so that power can be hydraulically and mechanically transmitted between the input and output shafts.

7 Claims, 4 Drawing Figures

CONTINUOUSLY VARIABLE HYDROSTATIC TRANSMISSION

BACKGROUND OF THE INVENTION

The present invention relates to continuously variable hydrostatic transmission with coaxial first and second radial piston machines in which the cylinder block of the first radial piston machine is secured to the input shaft, and a cylinder block of the second machine is fixedly secured to the housing of the machine.

The German AS 1,302,736 discloses an axial piston machine of this type, provided with wobble plates which are adjusted by cylinder and piston means controlled by valves. The apparatus is rather complicated and comparatively large.

SUMMARY OF THE INVENTION

It is one object of the invention to provide a hydrostatic transmission which is of compact contruction, and consists of simple parts, particularly as far as the adjusting means are concerned.

Another object of the invention is to provide a hydrostatic transmission particularly suitable for use in a motor car.

Another object of the invention is to provide a hydrostatic transmission which in a specific range of operations can mechnically transmit torque from the input shaft to the output shaft, resulting in high efficiency.

With these objects in view, the hydrostatic transmission according to the invention is constructed with first and second radial piston machines, each of which has an eccentrically adjustable actuator ring controlling the piston stroke, and adjusting means connected for rotation, but axially movable, with the output shaft of the transmission, and being adapted to eccentrically adjust the actuator rings.

In a preferred embodiment of the invention, the adjusting means include tubular end portions at least partly surrounding the actuator rings and having cam slots cooperating with follower means mounted on the actuator rings.

An embodiment of the invention comprises a housing in which input and output shafts are mounted for rotation about an axis; first and second radial piston machines including first and second actuator rings; adjusting means mounted on the output shaft and being connected with the output shaft for rotation, and for axial adjusting movement; and operating means for axially displacing the adjusting means.

The first cylinder block is fixedly secured to the input shaft for rotation, and the second cylinder block is fixedly secured to the housing means. The adjusting means are operatively connected with the first and second actuator rings for displacing the same between adjusted positions in which the eccentricities of the actuator rings relative to the axis of the shafts are different.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
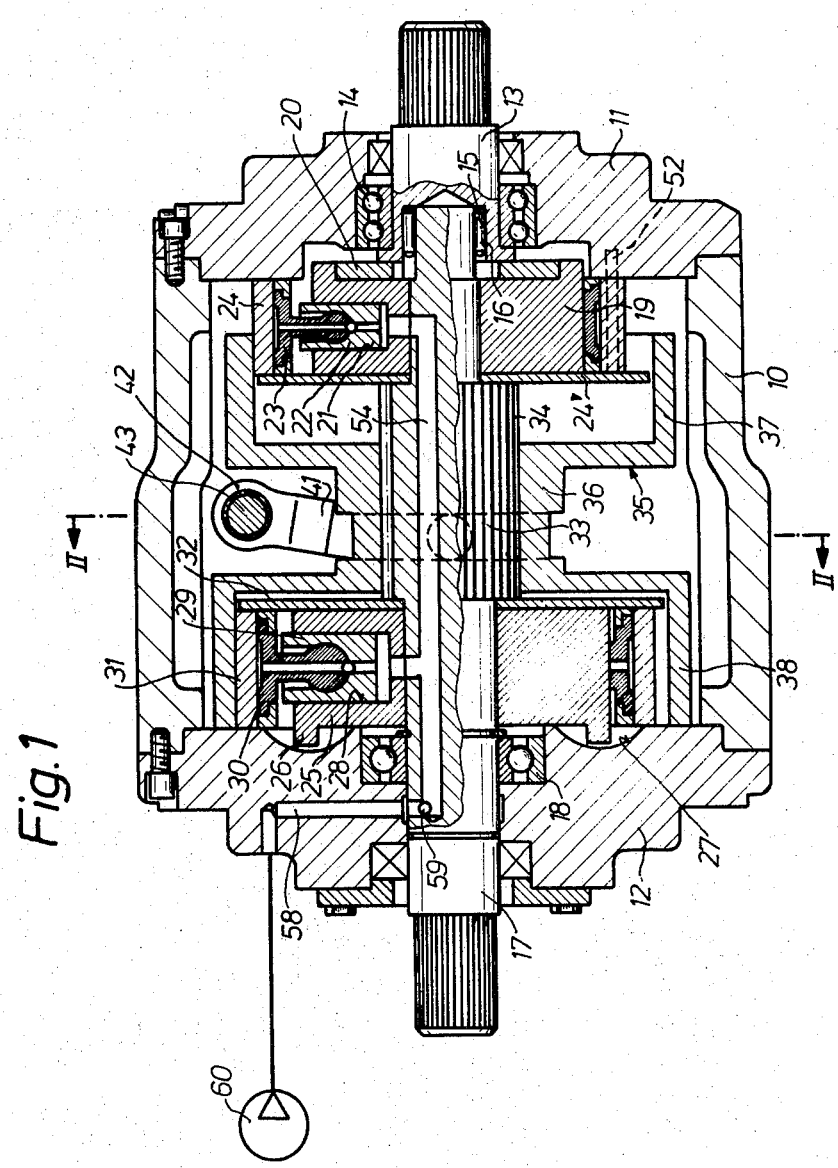
FIG. 1 is an axial sectional view illustrating a hydrostatic transmission in accordance with the invention.

Referring first to FIG. 1, a cylindrical housing 1 has open ends closed by end members or covers 11 and 12. An input shaft 13 is mounted in a bearing 14 in cover 11, and is driven by a motor, not shown. Input shaft 13 has a central blind bore 15 in which one end of an output shaft 17 is journalled by means of a pin bearing 16. A second bearing 18 for the output shaft 17, is also provided in cover 12. Input shaft 13 and output shaft 17 can rotate relative to each other about a common axis.

A first hydraulic machine, operated as a pump, is mounted adjacent cover 11, and a second hydraulic machine operating as a hydraulic motor is provided adjacent cover 12. The cylinder block 19 of the first hydraulic machine is rotatably mounted on the output shaft 17, and connected by coupling 20 with the input shaft 13 for rotation therewith. The cylinder block 19 has a plurality of radial cylinders 21 in which pistons 22 are slidably guided for radial movement. Pistons 22 have slide shoes 23 mounted in the respective pistons 22 for limited angular movement, and have outer surfaces slidingly engaging an actuator ring 24 which abuts cover 11 on one side, and a disk 24 on the other side. Parts 18–24 form the first radial piston machine of a hydrostatic transmission.

A second cylinder block 25 provided with projecting portions 26 located in recesses 27 on the inner surface of cover 12, is mounted on output shaft 17 for free relative rotary movement, so that output shaft 17 can rotate relative to the cylinder block 25 which is prevented from rotation. Cylinder block 25 has several radial cylinders 28 in which pistons 29 are guided for radial movement. Pistons 29 have slide shoes 30 which engage the inner annular surface of an actuator ring 31, which laterally abuts the inner surface of cover 12, and on the other side a disk 32. Parts 25 to 32 form a second radial piston machine which operates as a hydraulic motor.

The output shaft 17 has in the center portion between the first and second radial piston machines, an elongated central portion 33 of greater diameter provided with axial teeth and recesses 34, on which a central annular portion 36 of an adjustment means is mounted for axial movement. The adjusting means includes two tubular end portions at least partly surrounding the first and second actuator ring 24 and 31.

Figure 2:
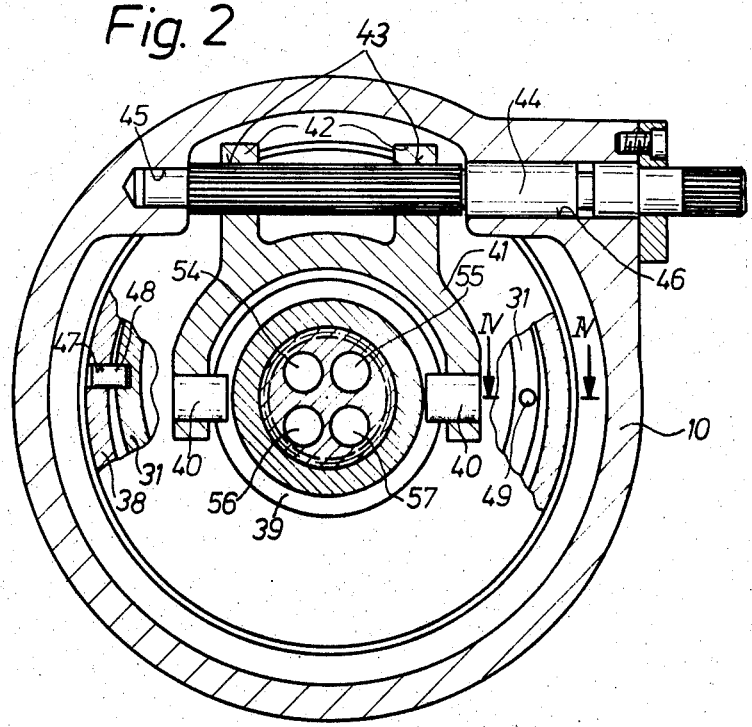
FIG. 2 is a cross sectional view taken on line II—II in FIG. 1.

In the central portion 36 of the adjusting means 35, an annular peripheral groove 39 is formed, engaged by two projections 40 which are secured to the arms of a fork shaped lever 41 which is provided with two arms 42 with alinged bores 43 through which a control shaft 44 passes, secured against rotation in the bores 43. Shaft 44 is mounted for angular movement in bearing bores 45, 46 of housing 10. In the tubular end portion 38 of adjusting means 35, a cam slot 47 is provided which includes a cam slot portion 47' slanted to the axis of the transmission, and a slot portion 47'', extending parallel to the axial direction. Cam slot 47 is engaged by a follower pin 48 secured in actuator ring 31, and projecting radially therefrom, see FIGS. 2 and 3. Diametrically opposite follower pin 48, a pivot means 49 penetrates the actuator ring 31 in axial direction, and is secured in the tubular end portion 38 of the adjusting means 35. Actuator ring 31 can be angularly displaced about the pivot 49 when adjusting means 35 is displaced in axial direction by operating means 44, 41, 40, and follower pin 48 is located in the slanted slot portion 47' of slot 47.

In the tubular end portion 37 of the adjusting means 35, another cam slot 50 is provided, which has a slanted slot portion 50', and another slot portion 50'' extending in the axial direction of the transmission. Cam slot 50 is engaged by follower pin 51 secured to the actuating ring 24 and radially projecting therefrom.

Diametrically opposite to follower pin 51, a pivot means 52, shown in FIG. 1 in broken line, penetrates actuating ring 24 in axial direction, and is secured to the housing cover 11. Actuating ring 24 is angularly displaceable about the pivot pin 52, when the adjusting means 35 is axially displaced, and when follower pin 51 is located in the slanted slot portion 50' of slot 50.

Four axially extending conduits 54, 55, 56, 57 are provided in the output shaft 17 which serve the supply and discharge of pressure fluid for the first and second radial piston machines. A channel 58 in cover 12 communicates through a check valve 59 with an auxiliary pump 60 which supplies pressure fluid to the low pressure inlet of the hydrostatic transmission when the same operates with closed circulation. A corresponding arrangement is provided for the conduit 56 which is used when the transmission is reversed.

Figure 3:
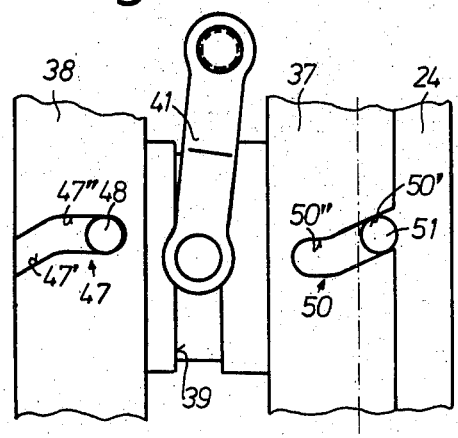
FIG. 3 is a fragmentary side view illustrating a detail.
Figure 4:
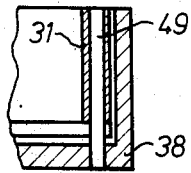
FIG. 4 is a fragmentary sectional view taken on lines IV—IV in FIG. 2.

In a neutral position of the transmission, follower pin 51 is located on a line L shown in broken lines in FIG. 3, while the follower pin 48 is located in the middle of the axially extending slot portion 47'. When the first radial piston machine is driven by input shaft 13, no pressure fluid is displaced, since the eccentricity of the actuator ring 24 is zero, and the pistons 22, 23 do not reciprocate. At the same time, the eccentricity of the actuator ring 31 is adjusted to a maximum eccentricity. When the actuator ring 24 of the first radial piston machine is adjusted by turning control shaft 44 so that follower pin 51 moves into the slot portion 50'', or in the opposite direction, the first radial piston machine begins to pump pressure fluid into the second radial piston machine. Since the cylinder block 25 of the second radial piston machine is blocked against rotation by the projections 26 in the recesses of cover 12, the actuator ring 31 is forced to rotate due to the action of the radially moving pistons 30. The torque produced in this manner is transmitted by the adjusting means 35 to the output shaft 17.

It is assumed that the rotary speed of the input shaft 13 is $n_1$, and the rotary speed of the output shaft 17 is $n_2$. As the eccentricity of the actuator ring 24 increases and the eccentricity of the actuator ring 31 decreases, the rotary speeds $n_1$ and $n_2$ approach each other. The difference $n_1-n_2$, multiplied by the pressure of the pressure fluid and by the momentary volume displaced by the first radial piston machine, results in the momentary hydraulic power portion of the entire power transmitted by the hydrostatic transmission.

When the first radial piston machine operates with actuator ring 24 in an adjusted position in which its eccentricity is a maximum, the displaced volume of the second radial piston machine is reduced. If the second radial piston machine is adjusted to a position in which the eccentricity of the actuator ring 31 relative to the axis of the transmission is zero, the first and second radial piston machines are hydraulically blocked, the ratio of the rotary speeds $n_1{:}n_2=1$, and the entire power is mechanically transmitted from input shaft 13, through actuator ring 31 of the second radial piston machine, to the adjusting means 35 and the output shaft 17. The hydraulically transmitted power becomes zero. For reversing the transmission, the adjusting means 35 is operated so that the follower pin 51 moves out of the neutral position and moves toward the open end of slot 50. The eccentricity of actuator ring 24 of the first radial piston machine, is now reversed as compared with the above-described operational condition. The functions remain the same, as described.

It will be understood that each of the elements described above, or two or more together, may also find a useful application in other types of hydrostatic transmissions differing from the types described above.

While the invention has been illustrated and described as embodied in a continuously variable hydrostatic transmission including adjusting means for the actuator rings of two radial piston machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected be Letters Patent is set forth in the appended claims.

I claim:

1. Continuously variable hydrostatic transmission comprising housing means; input and output shafts coaxially mounted in said housing means for rotation about an axis; first and second radial piston machines including first and second cylinder blocks mounted on said input and output shafts, respectively, and having radial cylinders, first and second pistons mounted in said radial cylinders of said first and second cylinder blocks, and first and second actuator rings surrounding said first and second cylinder blocks and being slidably engaged by said first and second pistions, respectively, said first cylinder block being fixedly secured to said input shaft for rotation, and said second cylinder block being fixedly secured to said housing means; adjusting means mounted on said output shaft between said first and second cylinder blocks, and being connected with said output shaft for rotation, and for axial adjustment movement, said adjusting means being operatively connected with said first and second actuator rings for displacing the same between adjusted positions in which eccentricities of said actuator rings relative to said axis are different; and operating means for axially displacing said adjusting means.

2. Hydrostatic transmission as claimed in claim 1 wherein said first and second cylinder blocks have inner circular surfaces in sliding engagement with the outer surface of said output shaft, and ducts connected with said cylinders, and opening in first and second ports on said inner circular surfaces, and wherein said output shaft has conduit means opening on said outer surface of said output shaft and communicating with said first and second ports.

3. Hydrostatic transmission as claimed in claim 1 wherein said adjusting means includes an annular central portion mounted on said output shaft, and first and second tubular end portions at least partly surrounding said first and second actuator rings, respectively, and having first and second cam slots; and wherein said first and second actuator rings have first and second follower means guided in said first and second cam slots, respectively.

4. Hydrostatic transmission as claimed in claim 3 wherein said operating means include a control shaft mounted on said housing means for turning movement, a forked lever secured to said control shaft and slidingly embracing an annular groove in said central portion of said annular adjusting means so that by turning of said control shaft, said annular adjusting means is axially displaced with said first and second cam slots.

5. Hydrostatic transmission as claimed in claim 4 comprising a first pivot means mounted on said housing means, and supporting said first actuator ring for angular movement between said adjusting positions; and a second pivot means mounted on said second tubular end portion of said adjusting means and supporting said second actuator ring for angular movement between said adjusted positions.

6. Hydrostatic transmission as claimed in claim 1 wherein said second block is mounted on said output shaft for relative rotation, and has axially projecting portions located in recesses formed in said housing means for blocking rotation of said second cylinder block so that said second actuator ring rotates.

7. Hydrostatic transmission as claimed in claim 1 wherein said first and second cylinder blocks have inner circular surfaces in sliding engagement with the outer surface of said output shaft, and ducts connected with said cylinders and opening in first and second ports on said inner circular surface; wherein said output shaft has conduit means opening on said outer surface of said output shaft and communicating with said first and second ports, and with a channel in said housing means; comprising a check valve between said conduit means and said channel; and a pump connected with said channel.

* * * * *